United States Patent [19]
Averbuch et al.

[11] Patent Number: 5,901,142
[45] Date of Patent: May 4, 1999

[54] METHOD AND APPARATUS FOR PROVIDING PACKET DATA COMMUNICATIONS TO A COMMUNICATION UNIT IN A RADIO COMMUNICATION SYSTEM

[75] Inventors: Rod Averbuch; Israel A. Cimet; Valy Lev, all of Buffalo Grove, Ill.

[73] Assignee: Motorola, Inc., Schaumburg, Ill.

[21] Appl. No.: 08/710,470

[22] Filed: Sep. 18, 1996

[51] Int. Cl.⁶ .............................. H04L 12/56; H04Q 7/20
[52] U.S. Cl. ..................... 370/329; 370/349; 370/469; 455/456; 455/458
[58] Field of Search ................................ 370/310, 328, 370/329, 331, 338, 345, 349, 419; 455/422, 433, 435, 456, 458, 507, 509, 515, 516, 517

[56] References Cited

U.S. PATENT DOCUMENTS

| | | | |
|---|---|---|---|
| 5,357,561 | 10/1994 | Grube | 455/456 |
| 5,442,637 | 8/1995 | Nguyen | 371/5.5 |
| 5,483,524 | 1/1996 | Lev et al. | 370/355 |
| 5,490,139 | 2/1996 | Baker et al. | 370/312 |
| 5,517,494 | 5/1996 | Green | 370/408 |
| 5,530,693 | 6/1996 | Averbuch et al. | 370/331 |
| 5,546,444 | 8/1996 | Roach, Jr. et al. | 455/412 |
| 5,548,586 | 8/1996 | Kito et al. | 370/349 |
| 5,564,071 | 10/1996 | Liou et al. | 455/520 |
| 5,566,181 | 10/1996 | Huang et al. | 370/312 |
| 5,570,359 | 10/1996 | Nguyen | 370/401 |
| 5,594,947 | 1/1997 | Grube et al. | 455/509 |
| 5,608,779 | 3/1997 | Lev et al. | 455/436 |
| 5,625,887 | 4/1997 | Cassidy et al. | 455/509 |
| 5,787,349 | 7/1998 | Taketsugu | 455/445 |

*Primary Examiner*—Chi H. Pham
*Assistant Examiner*—Kwang B. Yao
*Attorney, Agent, or Firm*—Kenneth A. Haas

[57] ABSTRACT

A radio communication system (100) employs a method and apparatus for providing packet data communications to a communication unit (e.g., 120). The communication system includes a system controller (102), a packet data router (101), and multiple base sites (103–109). Each base site serves a respective service coverage area (133–139) and the service coverage areas a grouped into multiple location areas (150–151). The packet data router receives a data packet intended for the communication unit and processes a transport protocol layer of the packet. The packet data router then determines whether the communication unit is presently involved in a packet data communication session based at least on information contained in the transport protocol layer of the packet. When the communication unit is presently involved in such a communication session, the packet data router provides the first data packet directly to the communication unit via a base site (104) serving a service coverage area (134) containing the communication unit. However, when the communication unit is not presently involved in such a communication session, the packet data router instructs the system controller to page the communication unit from the base sites (103–106) serving a location area (150) containing the communication unit.

14 Claims, 4 Drawing Sheets

| COMMUNICATION UNIT | MOBILITY STATUS | NO. OPEN SESSIONS | BASE SITE RECEIVING REGISTRATION | |
|---|---|---|---|---|
| | | | | —200 |
| 120 | PAGE | 0 | 104 | —201 |
| 121 | PAGE | 0 | 107 | —202 |
| 122 | PAGE | 0 | 108 | —203 |

| COMMUNICATION UNIT | MOBILITY STATUS | NO. OPEN SESSIONS | BASE SITE RECEIVING REGISTRATION | |
|---|---|---|---|---|
| | | | | —300 |
| 120 | TRANSMIT | 1 | 104 | |
| 121 | PAGE | 0 | 107 | |
| 122 | PAGE | 0 | 108 | | ed radio
METHOD AND APPARATUS FOR PROVIDING PACKET DATA COMMUNICATIONS TO A COMMUNICATION UNIT IN A RADIO COMMUNICATION SYSTEM

FIELD OF THE INVENTION

The present invention relates generally to radio communication systems and, in particular, to providing packet data communications to a communication unit in a radio communication system.

BACKGROUND OF THE INVENTION

Radio communication systems, such as trunked radio systems or cellular systems, are known to include a system controller, a plurality of base sites, and a plurality of communication units, such as mobile radios, portable radios, or radiotelephones. Each base site serves a corresponding service coverage area and typically provides at least one traffic channel and a control channel to the communication units that are located within the base site's service coverage area. The traffic channels are utilized to convey information between communication units or between communication units and public switched telephone network (PSTN) subscribers. The control channel is used to convey system information between the communication units and a particular base site.

During a typical communication, a communication unit moves throughout service coverage areas of the system. The movement of the communication unit requires the system controller to track the location of the communication unit within the system to enable the system controller to alert the communication unit when a call involving the communication unit is received at the system controller. That is, the system controller must know approximately where the communication unit is located in order to assign an appropriate base site to support a communication for the communication unit.

One known approach to tracking communication unit movement is known as the coverage area update approach. The coverage area update approach requires a communication unit to report, or register, each time the communication unit enters a different service coverage area. The communication unit monitors the system control channel to obtain the identification of the base site serving the coverage area containing the communication unit. Upon observing a change in the base site identification on the control channel, the communication unit transmits an inbound message on the control channel to register with the system controller in the new service coverage area. Therefore, when a communication arrives at the system controller for a particular communication unit, the system controller simply transmits the communication to the communication unit via the base site serving the service coverage area containing the communication unit. Although this approach facilitates expedient call set-up because the system controller always knows the service coverage area within which a particular communication unit is located, the approach requires substantial inbound signaling on the control channel to maintain location reporting accuracy to within a base site's service coverage area. Excessive inbound control channel activity results in inefficient use of both the control channel and system controller resources that are necessary to process the abundance of registration messages. Due to its excessive inbound control channel activity, coverage area tracking is generally used only when tracking a communication unit that is actively participating in a communication.

Another known approach to tracking communication unit movement is known as the location area update approach. The location area update approach requires a communication unit to report, or register, each time the communication unit enters a different so-called location area. A location area typically comprises multiple base site service coverage areas and, accordingly, is serviced by multiple base sites. With this approach, the communication unit monitors the system control channel to obtain the identification of the location area containing the communication unit. Upon observing a change in the location area identification on the control channel, the communication unit transmits an inbound message on the control channel to register with the system controller in the new location area. Since the number of location areas is generally less than the number of service coverage areas, the communication unit registers proportionately less with the location area update approach than with the coverage area update approach. Thus, the location area update approach involves substantially less inbound control channel activity than does the coverage area update approach.

With location area tracking, when a communication arrives at the system controller for a particular communication unit, the system controller pages the communication unit from all the base sites serving the location area containing the communication unit. Upon receiving an acknowledgment of the page from the communication unit, the system controller transmits the communication to the communication unit via the base site that received the page acknowledgment. Thus, although the location area update approach reduces the amount of inbound control channel activity as compared with the coverage area update approach, the location area update approach increases the amount of outbound control channel activity (i.e., pages). Due to its excessive amount of outbound control channel activity, location area tracking is generally used only when tracking a communication unit that is not actively participating in a communication.

Packet data communications are becoming more popular in trunked radio communication systems. The nature of packet data communications is such that a single communication is comprised of multiple data packets. In such systems, the system controller is divided into two entities, the controller and a packet data router. The controller performs registration, paging, and other system control functions. The packet data router extracts a destination address (e.g., Internet protocol (IP) address) for each received data packet from a network layer (layer 3) of the packet and, in response to signaling from the controller, directs the received data packets to the appropriate base sites for subsequent transmission to the appropriate target communication units. In addition, the various data protocols utilized in the wireline packet routing network (e.g., the Internet) to convey the data packets often causes groups of packets of the communication to arrive at the packet data router/controller at different times. Thus, in many circumstances, the router/controller must contact the communication unit more than one time to provide the complete packet data communication to the communication unit.

In a packet data communication, a communication unit is considered to be actively participating in a communication only during the time when either the data packets are being delivered to the communication unit or the communication unit is transmitting its data packets. When the communication unit is awaiting additional packets to complete the communication, the communication unit is not considered to be actively participating in the communication. Therefore, when the system controller or packet data router is transmitting data packets to the communication unit, the communication unit utilizes coverage area tracking; whereas, when the system controller or packet data router is awaiting more data packets to the complete the communication, the communication unit utilizes location area tracking. Consequently, the system controller must page the communication unit on more than one occasion to deliver a single packet data communication. The subsequent number of pages undesirably increases the amount of outbound control channel activity per communication.

Therefore, a need exists for a method and apparatus of providing packet data communications to a communication unit in a radio communication system that efficiently utilizes inbound and outbound control channel resources.

DESCRIPTION OF A PREFERRED EMBODIMENT

Generally, the present invention provides a method and apparatus for providing packet data communications to a communication unit in a radio communication system. The radio communication system includes a system controller and a packet data router, both of which are coupled to a plurality of base sites. Each base site serves a respective service coverage area and the service coverage areas a grouped into a plurality of location areas. The packet data router receives a first data packet intended for the communication unit and processes a transport protocol layer (e.g., layer 4 in the well-known Open Systems Interconnection (OSI) model) of the first packet. The packet data router then determines whether the communication unit is presently involved in a packet data communication session based at least on information contained in the transport protocol layer of the first packet. When the communication unit is presently involved in such a communication session, the packet data router provides the first data packet directly to the communication unit via a base site serving a service coverage area containing the communication unit.

However, when the communication unit is not presently involved in a packet data communication session, the packet data router instructs the system controller to page the communication unit from the base sites serving the location area containing the communication unit. By providing a packet data communication to the communication unit in this manner, the present invention substantially reduces the amount of control channel activity (paging or registering) normally associated with delivering such a communication by examining the transport protocol layer (layer 4), as opposed to only the network protocol layer (layer 3), of the received packet to determine whether the communication unit is already involved in a packet data communication session and, thereby, locatable for direct transmission of the received packet without the need to page.

Figure 1:
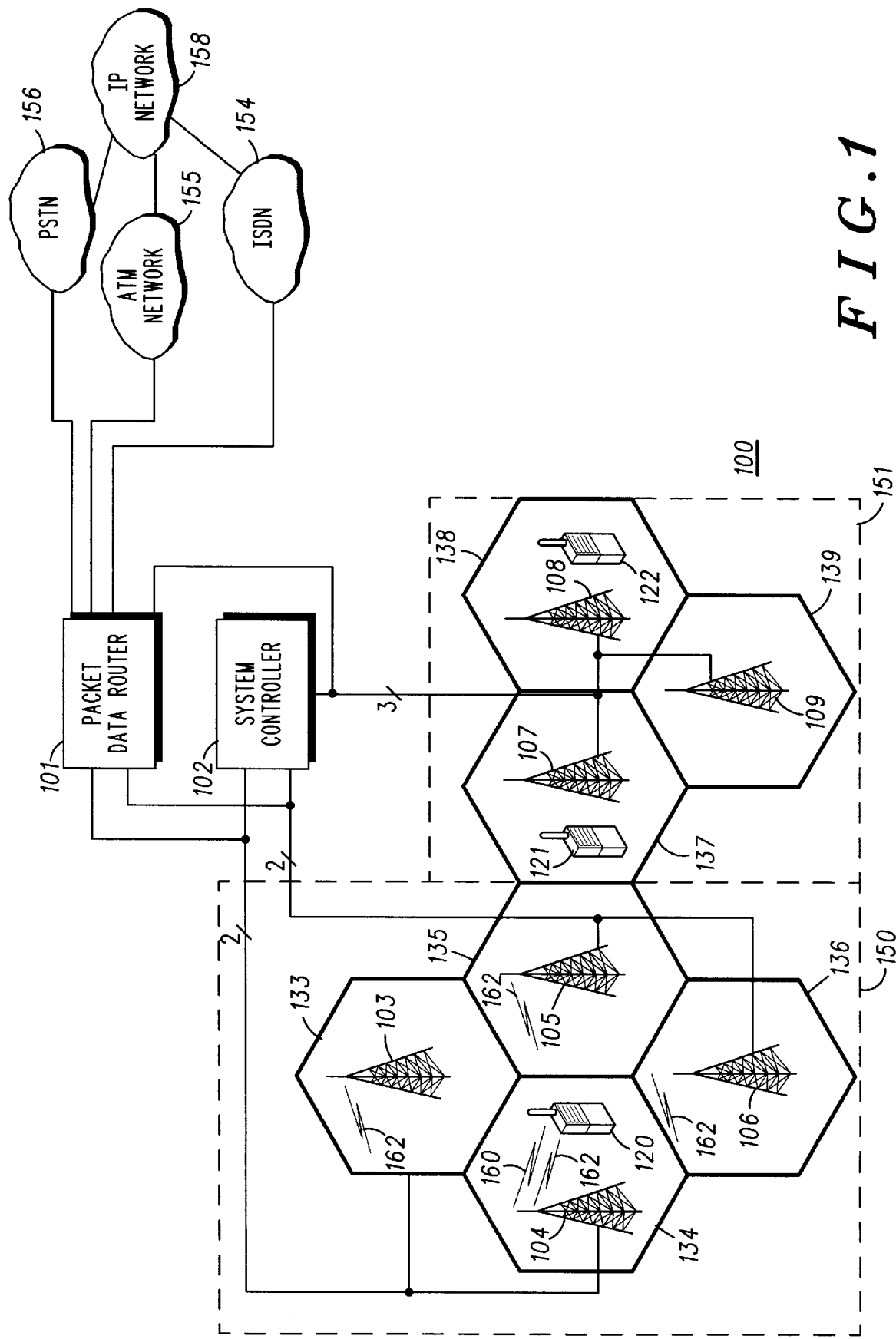
FIG. 1 illustrates a block diagram of an exemplary radio communication system that may beneficially employ the present invention.

The present invention can be more fully understood with reference to FIGS. 1–6. FIG. 1 illustrates a block diagram of an exemplary radio communication system 100 that may beneficially employ the present invention. The radio communication system 100 includes a packet data router 101, a system controller 102, a plurality of base sites 103–109, and a plurality of communication units 120–122. Each base site 103–109 provides communication service to (i.e., serves) a corresponding service coverage area 133–139. The base site service coverage areas 133–139 are grouped into one or more location areas 150–151 (two shown). Thus, each location area 150–151 includes one or more of the base site service coverage areas 133–139 and, accordingly, one or more of the base sites 103–109. The base sites 103–109 are coupled to the packet data router 101 and the system controller 102 via communication links, such as T1 wireline, fiber optic, or microwave links.

In a preferred embodiment, the radio communication system comprises a trunked radio communication system, such as the "iDEN" platform that is commercially available from Motorola, Inc. The packet data router 101 preferably comprises a Motorola Data Gateway and the system controller 102 preferably comprises an "iDEN" Dispatch Application Processor. Although shown as two separate entities in FIG. 1, the packet data router 101 and the system controller 102 may be two parts of the same entity in an alternative embodiment.

The base sites 103–109 preferably support one or more trunking communication platforms, such as frequency division multiple access (FDMA), time division multiple access (TDMA), or code division multiple access (CDMA). In the preferred embodiment, the base sites 103–109 comprise "iDEN" Enhanced Base Transceiver Sites. The communication units 120–122 preferably comprise any wireless devices, such as wireless data terminals, radios, or radiotelephones, that are capable of receiving and transmitting (transceiving) data packets. In alternative embodiments, one or more of the communication units 120–122 may comprise a data terminal coupled to a wireless communication device.

Operation of the radio communication system 100 occurs substantially as follows in accordance with the present invention. When each communication unit 120–122 is initially activated, it registers with the system controller 102 by first identifying a serving base site from control channel transmissions of all the base sites 103–110, as is well-known in the art, and then transmitting a registration message to the system controller 102 via the identified serving base site. Upon receiving the registrations, the system controller 102 affiliates each communication unit 120–122 with its serving base site and the location area that includes the service coverage area of the serving base site. The system controller 102 then stores the registrations in a lookup table (not shown) located in the system controller's random access memory (RAM).

Figures 2, 3, 4:
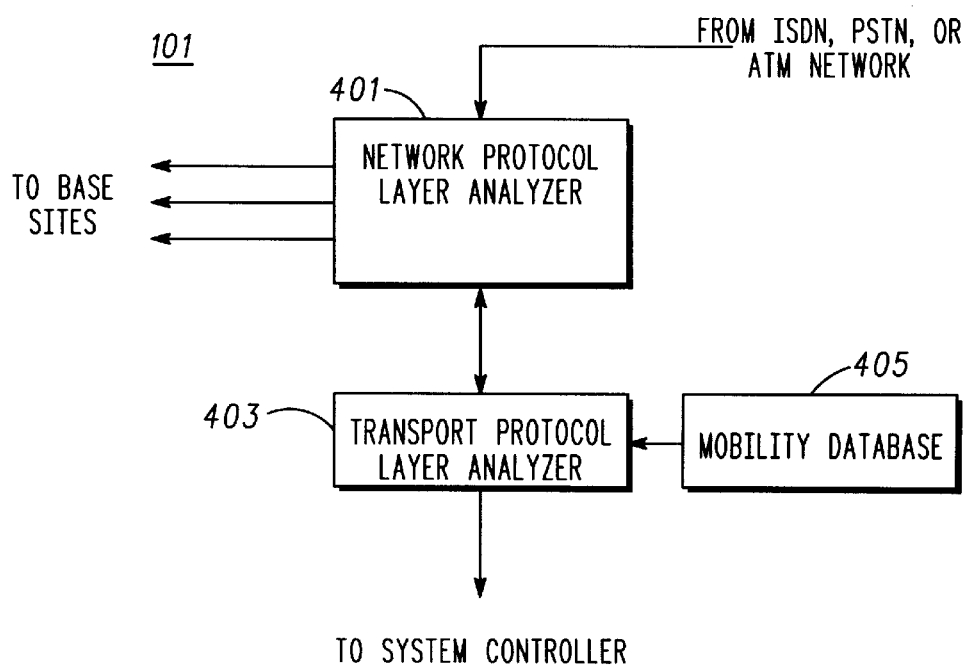
FIG. 2 illustrates initial entries in a mobility database in accordance with the present invention.
FIG. 3 illustrates updated entries in a mobility database in accordance with the present invention.
FIG. 4 illustrates a block diagram depiction of a packet data router in accordance with a preferred embodiment of the present invention.

The registrations are also stored in a mobility database located in the packet data router 101. The mobility database provides a means for the packet data router 101 to determine the mobility status of a particular communication unit (i.e., whether the communication unit can receive a data packet directly or whether the communication unit must first be paged by the system controller 102). An exemplary, initial mobility database 200 is illustrated in FIG. 2. For the purposes of this discussion, it is assumed that communication unit 120 registers initially via base site 104, communication unit 121 registers initially via base site 107, and communication unit 122 registers initially via base site 108. The mobility status of each initially registered communication unit 120–122 is set to require paging of the communication unit in the event that the packet data router 101 receives a data packet data for the respective communication unit. The association of each communication unit 120–122 with its respective mobility status, number of open or ongoing communication sessions, and serving base site is provided by the entries 201–203 in the initial mobility database 200.

When the packet data router 101 receives a data packet for one of the communication units (e.g., 120) from some other entity, such as another one of the communication units (e.g., 121) or a subscriber to the Internet Protocol (IP) network 158 (e.g., via an integrated services digital network (ISDN) 154, an asynchronous transfer mode (ATM) network 155, or a public switched telephone network (PSTN) 156), the packet data router 101 processes a transport protocol layer (e.g., OSI layer 4) of the data packet. As is known, the transport protocol layer is typically used by a host (e.g., a computer coupled to the IP network) and an end user (e.g., communication unit 120) to open (set-up) and close (terminate) a communication session therebetween. By examining the transport protocol layer of the data packet, the packet data router 101 can determine whether the received data packet is opening, closing, or continuing a present packet data communication session.

For example, a header of the transport protocol layer typically indicates the session type and application type of the communication session containing the received data packet. When the session type is a transport control protocol (TCP), the end user automatically knows that multiple packets will be, or are being, conveyed and that the transport protocol layer indicates explicitly (e.g., via TCP header code bits) whether the data packet is opening or closing the communication session. When the session type is a user datagram protocol (UDP) or Appletalk transaction protocol, the end user does not know how many packets are involved (one or more) and must determine the application type of the communication session. For example, when the application type is a trivial file transfer protocol (TFTP) in UDP, multiple packets will be, or are being conveyed; whereas, when the application type is a control message protocol, only the received packet comprises the complete communication session. As is known, the end or termination of a multi-packet TFTP session in UDP is indicated by a packet containing less than 512 bytes.

When the transport protocol layer of the received packet indicates that the received packet is part of an ongoing communication session (i.e., is either continuing or ending the communication session), the packet data router 101 consults the mobility database 200 and provides the received data packet directly to the base site 104 indicated in the mobility database 200 as serving the target communication unit 120 (i.e., the communication unit 120 for which the data packet is intended). The base site 104 then transmits the data packet to the communication unit 120.

When the transport protocol layer of the received packet indicates that the received packet is opening a communication session, the packet data router 101 consults the mobility database 200 to determine whether the target communication unit 120 is presently involved in any other open communication sessions. When the target communication unit 120 is not presently involved in any other communication sessions (as shown in the target unit's entry 201 in the initial mobility database 200), the packet data router 101 instructs the system controller 102 to page the target communication unit 120 from each base site 103–106 serving a service coverage area 133–136 that is located in a location area 150 containing the communication unit 120. Accordingly, the system controller 102 pages the communication unit 120 from the base sites 103–106 over a paging control channel 162.

Upon receiving a page, the target communication unit 120 transmits an acknowledgment of the page over the paging control channel 162 to the system controller 102 via the base site (e.g., 104) serving the service coverage area 134 currently containing the communication unit 120. Responsive to the acknowledgment, the system controller 102 instructs the packet data router 101 to provide the data packet to the base site 104 that received the acknowledgment of the page. The packet data router 101 then provides the data packet to the appropriate base site 104 and updates the mobility database 300, as shown in FIG. 3, to reflect the opening of a communication session involving the communication unit 120 and the change of the communication unites mobility status (i.e., from requiring a page to permitting direct transmission via the base site indicated in the mobility database 300). Upon receiving the data packet, the base site 104 transmits the packet to the target communication unit 120 via a radio frequency (RF) communication resource, or channel 160, assigned to the base site 104.

Upon receiving the data packet from the base site 104, the communication unit 120 processes the transport protocol layer of the packet to determine whether to expect additional data packets. The communication unit 120 analyzes the session type and, if necessary, the application type in the transport protocol layer header to determine if additional data packets are forthcoming. Similar to the packet data router 101, the communication unit 120 includes a database that indicates the number of open communication sessions involving the communication unit 120. When at least one communication session is open (i.e., when the communication unit 120 is presently involved in at least one communication session), the communication unit 120 re-registers with the system controller 102 upon entering each new base site service coverage area 133–139 and expects to receive more data packets from the base site serving the service coverage area currently containing the communication unit 120 (i.e., the base site to which the communication unit 120 transmitted its most recent registration message). However, when no communication sessions are open, the communication unit 120 re-registers upon entering each new location area 150–152 and monitors the paging control channel in expectation of the opening of a new packet data communication session. Therefore, when at least a second data packet is to be received in the communication session containing the presently received data packet, the communication unit 120 determines that it is to remain involved in the communication session and re-registers upon entering a new base site service coverage area.

The communication unit 120 preferably determines which base site service coverage area 133–139 or location area 150–151 the communication unit 120 is currently located in based on broadcast control channel transmissions from the base sites 103–109. In a preferred embodiment, each base site transmits its base site identification and location area identification to communication units in its service coverage area over a broadcast control channel every few seconds (e.g., ten seconds) depending on the message load of the broadcast control channel. Upon receiving the base site and location area identifications, the communication unit 120 knows whether or not it has changed service coverage areas or location areas and determines whether or not to register based on its mobility status.

As the communication unit 120 moves throughout the communication system 100, the communication unit 120 re-registers in accordance with its mobility status. When at least one communication session involving the communication unit 120 is open, the packet data router 101 updates its mobility database 300 in response to a received registration at the system controller 102 to include the base site that received the most recent communication unit registration. Thus, in the event that additional data packets are received for an ongoing packet data communication session, the packet data router 101 can deliver them to the communication unit 120 via the base site that received the most recent registration, without having to instruct the system controller 102 to page the communication unit first. Therefore, through processing of the transport protocol layer by both the packet data router 101 and the communication unit 120, the present invention uses control channel resources efficiently by paging the communication unit only when there are no open communication sessions in which the communication unit is currently involved and requiring the communication unit to re-register upon entering base site service coverage areas only when the communication unit is involved in at least one open communication session. In this manner, the present invention strikes a preferred balance between the amount of outbound control channel traffic (pages) and the amount of inbound control channel traffic (registrations) for any particular communication unit in the packet data radio communication system 100.

FIG. 4 illustrates a block diagram depiction of the packet data router 101 in accordance with a preferred embodiment of the present invention. The packet data router 101 includes a network protocol layer analyzer 401, a transport protocol layer analyzer 403, and a mobility database 405. In the preferred embodiment, the network protocol layer analyzer 401, the transport protocol layer analyzer 403, and the mobility database 405 are all embodied in a software routines running on a microprocessor. However, in an alternate embodiment, the network protocol layer analyzer 401, the transport protocol layer analyzer 403, and the mobility database 405 may be configured in hardware using memory and commercially available protocol analyzer chip sets.

Upon receiving a data packet, the network protocol layer analyzer 401 processes a network protocol layer (e.g., OSI layer 3) of the data packet to determine a routing address of the packet. The routing address of the packet preferably comprises the routing or IP address of the target communication unit. The network protocol layer analyzer 401 then provides the IP address to the transport protocol layer analyzer 403.

The transport protocol layer analyzer 403 receives the data packet and IP address, and processes a transport protocol layer (e.g., OSI layer 4) of the data packet. Based on information (e.g., session type or application type) contained in the transport protocol layer, the transport protocol layer analyzer 403 determines whether the target communication unit is presently involved in one or more packet data communication sessions To make such a determination, the transport protocol layer analyzer 403 determines whether the received packet is an opening, a closing, or a continuing data packet in a communication session and queries the mobility database 405, which, as described above, includes the mobility status of the target communication unit and the number of open communication sessions involving the target communication unit. When the target communication unit is presently involved in at least one communication session, the transport protocol layer analyzer 403 instructs the network protocol layer analyzer 401 to route the received data packet to the base site identified in the mobility database 405 as receiving the target communication unit's most recent registration. When the target communication unit is not presently involved in at least one communication session, the transport protocol layer analyzer 403 instructs the system controller to page the target communication unit via each base site serving a location area containing the communication unit. Upon receiving the identity of the base site serving the communication unit from the system controller, the transport protocol layer analyzer 403 instructs the network protocol layer analyzer 401 to route the received data packet to the base site identified by the system controller.

Figure 5:
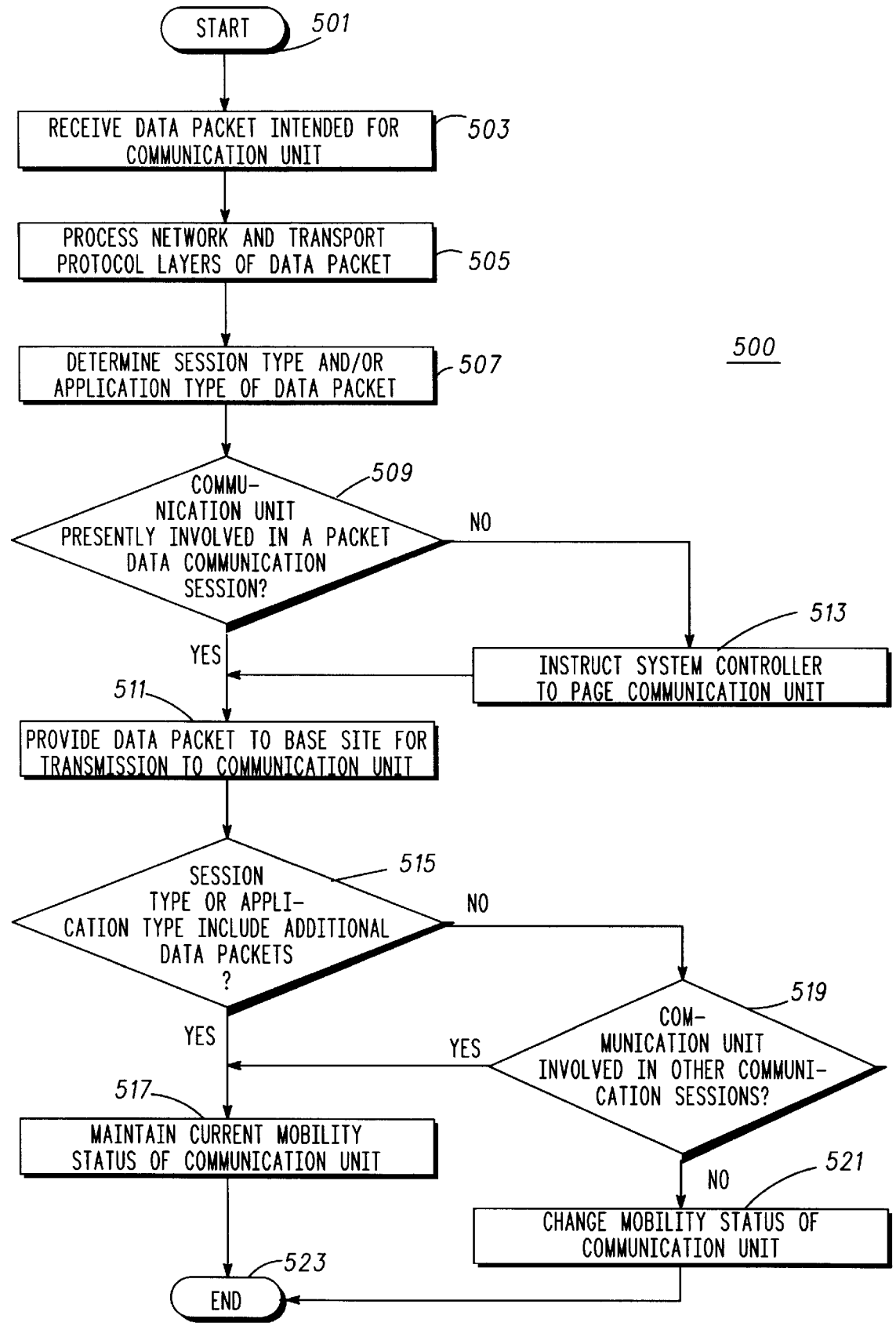
FIG. 5 illustrates a logic flow diagram of steps executed by a packet data router to provide a packet data communication to a communication unit in accordance with a preferred embodiment of the present invention.

FIG. 5 illustrates a logic flow diagram 500 of steps executed by a packet data router to provide a packet data communication to a communication unit in accordance with a preferred embodiment of the present invention. The logic flow begins (501) when the packet data router receives (503) a data packet intended for the communication unit. The packet data router then processes (505) both the network and transport protocol layers of the data packet. The network protocol layer provides the identification of the target communication unit; whereas, the transport protocol layer provides information regarding the communication session that includes the received data packet. During its processing of the transport protocol layer, the packet data router determines (507) the session type and/or the application type of the communication session containing the received data packet by analyzing the header of the transport protocol layer. In the preferred embodiment, the session type is one of TCP, UDP, or Appletalk transaction protocol. When the header indicates that the session type is TCP, the header also indicates whether the currently received data packet is opening or closing the session. However, when the header indicates that the session type is UDP or Appletalk transaction protocol, the packet data router must look to the application type to determine whether additional packets are forthcoming and whether the currently received data packet is opening or closing the session. In a preferred embodiment, the application type may be a file transfer protocol (FTP) for a TCP session, a trivial file transfer protocol (TFTP) or a control message protocol for a UDP session, or a simple mail transfer protocol (SMTP) for either a TCP or a UDP session.

Upon processing the transport protocol layer of the received packet, the packet data router determines (509) whether the communication unit is presently involved in a packet data communication session. This determination is made by examining the packet's session type or application type, or by querying the packet data router's mobility database. Depending on the session type, the packet data router determines whether the received data packet is opening, closing, or continuing a packet data communication session through examination of the packet's session or application type. For example, when the session type is TCP, the session information indicates whether the received packet is opening or closing a session. When the packet is neither opening nor closing a session, the packet is, by default, continuing a communication session. Accordingly, when the session information indicates that the received packet is continuing or closing a communication session, the packet data router knows that the communication unit is at least involved in the communication session being continued or closed and, therefore, is presently involved in a packet data communication session.

Similarly, when the session type is UDP, the application information indicates whether the received packet is opening or closing a session. When the packet is neither opening nor closing a session, the packet is continuing a communication session. Accordingly, when the application information indicates that the received packet is continuing or closing a communication session, the packet data router knows that the communication unit is at least involved in the communication session being continued or closed and, therefore, is presently involved in a packet data communication session. However, it should be noted that in a UDP session, a control message protocol application consists of a single packet that both opens and closes the communication session. Thus, in the control message UDP case, the packet data router does not presume that the received packet is part of a presently ongoing communication session.

When the session or application type indicates that the received data packet is opening a communication session, the packet data router queries its mobility database, as described above, to determine whether the communication unit is involved in at least one other communication session.

When, through any one of the above-described techniques, the packet data router determines that the communication unit is presently involved in a packet data communication session, the packet data router provides (511) the received data packet directly to the base site indicated in the mobility database for transmission to the communication unit. However, when the packet data router determines that the communication unit is not presently involved in a packet data communication session, the packet data router instructs (513) the system controller to page the communication unit from each base site serving the location area from which the communication unit last registered. Upon acknowledgment of the page at the system controller and identification of the base site that received the acknowledgment, the packet data router provides (511) the received data packet to the base site that received the acknowledgment for eventual transmission to the communication unit.

Once the packet has been provided to the appropriate base site, or while the packet is being provided to the appropriate base site, the packet data router determines (515) whether to expect any additional data packets for the communication unit based on the session type or application type of the received data packet. When the session type or application type explicitly (as in TCP) or implicitly (as in the less than 512 byte packet of UDP) includes more data packets than the received data packet, the packet data router expects additional data packets to be forthcoming and maintains (517) the current mobility status of the communication unit to end (523) the logic flow. In this case, the packet data router would maintain the current mobility status by providing a subsequently received data packet directly to a base site that received the communication unit's most recent registration for transmission to the communication unit.

In an alternative embodiment, the packet data router sets a timer upon receipt of each data. In this embodiment, when the session type or application type indicates that the communication session includes additional data packets and a subsequent packet is not received at the packet data router within a predetermined period of time (e.g., 60 seconds or less) of the previous packet, the packet data router changes the current mobility status of the communication unit to indicate that the communication unit is to be paged prior to transmission of the subsequent packet. This alternative embodiment might be utilized in a communication system, such as a high error rate system in which end of session packets are easily lost, that encounters long delays in providing data packets from the IP network to the packet data router.

When the current packet is terminating or closing the communication session containing the packet, the packet data router determines (519) whether the communication unit is involved in any other open communication sessions by querying the mobility database. When the communication unit is involved in another open communication session, the packet data router maintains (517) the direct delivery mobility status of the communication unit and the logic flow ends (523). However, when the communication unit is not involved in another open communication session (i.e., when every packet data communication session involving the communication unit has terminated), the packet data router changes (521) the mobility status of the communication unit to indicate that the communication unit is to be paged prior to transmission of a subsequent data packet and the logic flow ends (523).

Figure 6:
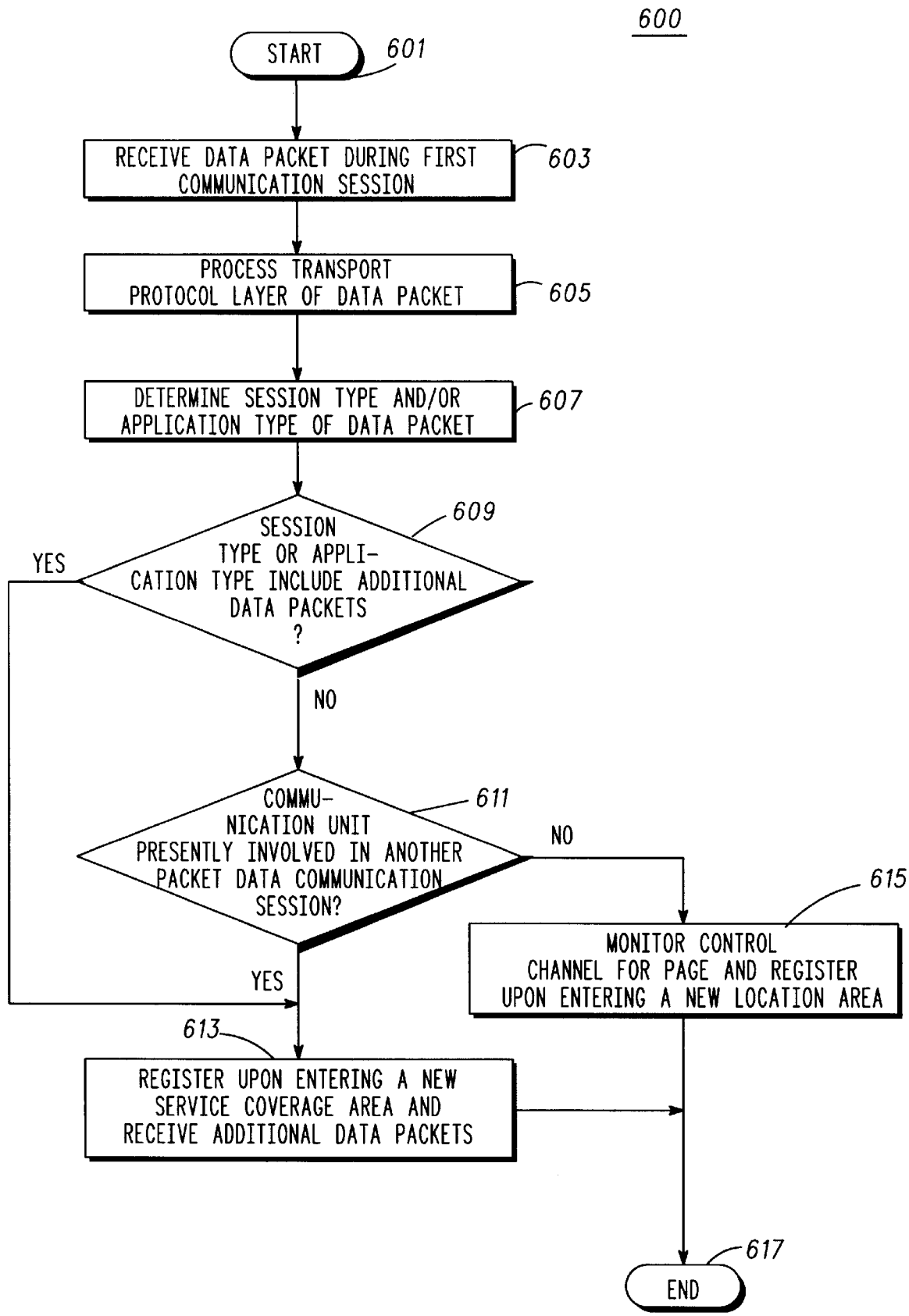
FIG. 6 illustrates a logic flow diagram of steps executed by a communication unit to participate in a packet data communication in accordance with a preferred embodiment of the present invention.

FIG. 6 illustrates a logic flow diagram 600 of steps executed by a communication unit to participate in a packet data communication in accordance with a preferred embodiment of the present invention. The logic flow begins (601) when the communication unit receives (603) a data packet during a first communication session. The communication unit then processes (605) the transport protocol layer of the data packet. During its processing of the transport protocol layer, the communication unit determines (607) the session type and/or the application type of the communication session containing the received data packet by analyzing the header of the transport protocol layer. Based on the session type or application type, the communication unit determines (609) whether to expect additional data packets in the first communication session (i.e., whether the communication unit is to remain involved in the first communication session). When the communication unit is to remain involved in the first communication session, the communication unit registers (613) with the system controller upon entering each new base site service coverage area and continues (613) to receive additional data packets without being paged first, thereby ending (617) the logic flow.

When, however, the communication unit is not to remain involved in the first communication session, the communication unit determines (611) whether it is to remain presently involved in any other communication session When the communication unit is to remain presently involved in at least one other communication session, the communication unit registers (613) with the system controller upon entering each new base site service coverage area and continues (613) to receive additional data packets without being paged first, thereby ending (617) the logic flow. However, when the communication unit is not to remain presently involved in at least one other communication session, the communication unit monitors (615) a control channel for a page and registers (615) with the system controller upon entering each new location area, thereby ending the logic flow (617).

The present invention provides a method and apparatus for providing packet data communications to a communication unit in a radio communication system. With this invention, the overall amount of control channel activity (i.e., inbound and outbound) associated with delivering data packets to a communication unit is substantially reduced as compared to existing techniques. The present invention reduces the net amount of control channel activity by tracking the communication unit on a location area basis when the communication unit is not currently involved in at least one packet data communication session and by tracking the communication unit on a base site coverage area basis when the communication unit is currently involved in at least one packet data communication session. By reducing the control channel activity associated with delivering data packets, the present invention permits utilization of fewer control channel resources as compared to existing tracking techniques, thereby allowing some control channel resources to be converted to traffic channel resources to facilitate additional data packet transmissions and, thus, improve overall packet data throughput.

While the present invention has been particularly shown and described with reference to particular embodiments thereof, it will be understood by those skilled in the art that various changes in form and details may be made therein without departing from the spirit and scope of the present invention.

We claim:

1. In a mobile radio communication system that includes a system controller, a packet data router, a communication unit, and a plurality of base sites, the plurality of base sites serving respective service coverage areas, the service coverage areas being grouped into a plurality of location areas, and each location area of the plurality of location areas including at least one service coverage area, a method for the packet data router to provide packet data communications to the communication unit, the method comprising the steps of:

receiving a first data packet intended for the communication unit;

processing a transport protocol layer of the first data packet;

determining whether the communication unit is presently involved in a packet data communication session based at least on information contained in the transport protocol layer of the first data packet;

when the communication unit is presently involved in a packet data communication session, providing the first data packet to the communication unit via a first base site serving a service coverage area containing the communication unit; and when the communication unit is not presently involved in a packet data communication session, instructing the system controller to transmit a page to the communication unit via each base site serving a service coverage area of a location area containing the communication unit.

2. The method of claim 1, further comprising the steps of:

receiving, from the system controller, an identification of a second base site serving a service coverage area containing the communication unit, the second base site being a base site that received an acknowledgment of the page from the communication unit; and providing the first data packet to the communication unit via the second base site.

3. The method of claim 1, wherein the step of processing the transport protocol layer comprises the step of determining a session type of a first packet data communication session that includes the first data packet, the session type being indicated within the transport protocol layer of the first data packet, and wherein the step of determining whether the communication unit is presently involved in a packet data communication session comprises the steps of:

determining whether the first packet data communication session has terminated based on the session type of the first packet data communication session; and determining whether every other packet data communication session involving the communication unit has terminated;

the method further comprising the step of:

when the first packet data communication session and every other packet data communication session involving the communication unit have terminated, changing a current mobility status of the communication unit at the packet data router to produce an updated mobility status, wherein the updated mobility status indicates that the communication unit is to be paged prior to transmission of a subsequently received data packet.

4. The method of claim 3, wherein the session type is a transport control protocol, a user datagram protocol, or an Appletalk transaction protocol.

5. The method of claim 1, further comprising the steps of:

determining an application type of a packet data communication session that includes the first data packet, the application type being indicated within a header of the transport protocol layer of the first data packet;

determining whether at least a second data packet is to be received based on the application type; and when at least a second data packet is to be received, maintaining a current mobility status of the communication unit at the packet data router, such that the current mobility status indicates that the at least a second packet, when received by the packet data router, is to be transmitted directly to the communication unit via a base site that received a most recent registration from the communication unit.

6. The method of claim 5, further comprising the step of:

when the at least a second data packet is received, transmitting the at least a second data packet to the communication unit via the base site that received the most recent registration from the communication unit.

7. The method of claim 5, wherein the step of determining whether at least a second data packet is to be received further comprises the steps of:

determining whether the at least a second data packet is received within a predetermined period of time after receipt of the first data packet; and when the at least a second data packet is not received within the predetermined period of time, changing the current mobility status of the communication unit to produce an updated mobility status, wherein the updated mobility status indicates that the communication unit is to be paged prior to transmission of the at least a second data packet.

8. The method of claim 5, wherein the application type is a file transfer protocol, a trivial file transfer protocol, or a simple mail transfer protocol.

9. In a mobile radio communication system that includes a packet data router, a communication unit, a system controller, and a plurality of base sites, the plurality of base sites serving respective service coverage areas, wherein the service coverage areas are grouped into a plurality of location areas, each location area of the plurality of location areas including at least one service coverage area, a method for the communication unit to participate in packet data communications, the method comprising the steps of:

receiving, via a first base site, a first data packet from the packet data router during a first packet data communication session;

processing a transport protocol layer of the first data packet;

determining whether the communication unit is to remain involved in the first packet data communication session based at least on information contained in the transport protocol layer of the first data packet;

when the communication unit is to remain involved in the first packet data communication session, transmitting a registration message to the system controller upon entering a new service coverage area;

when the communication unit is not to remain involved in the first packet data communication session, determining whether the communication unit is to remain involved in at least a second packet data communication session;

when the communication unit is to remain involved in the at least a second packet data communication session transmitting a registration message to the system controller upon entering a new service coverage area;

when the communication unit is not to remain involved in the at least a second packet data communication session,
  monitoring a control channel to determine whether the communication unit is being paged to begin a third packet data communication session; and
  transmitting a registration message to the system controller upon entering a new location area.

10. In a mobile radio communication system that includes a packet data router, a communication unit, a system controller, and a plurality of base sites, the plurality of base sites serving respective service coverage areas, a method for the communication unit to participate in packet data communications, the method comprising the steps of:

receiving, via a first base site, a first data packet from the packet data router during a first packet data communication session;

processing a transport protocol layer of the first data packet, wherein the step of processing the transport protocol layer comprises the step of determining a session type of the first packet data communication session, the session type being indicated within the transport protocol layer of the first data packet;

determining whether the communication unit is to remain involved in the first packet data communication session based at least on information contained in the transport protocol layer of the first data packet, wherein the step of determining whether the communication unit is to remain involved in the first packet data communication session comprises the step of determining, based on the session type of the first packet data communication session, whether the first packet data communication session includes additional data packets; and when the communication unit is to remain involved in the first packet data communication session, transmitting a registration message to the system controller upon entering a new service coverage area.

11. The method of claim 10 wherein the session type is a transport control protocol, a user datagram protocol, or an Appletalk transaction protocol.

12. In a mobile radio communication system that includes a packet data router a communication unit a system controller, and a plurality of base sites, the plurality of base sites serving respective service coverage areas, a method for the communication unit to participate in packet data communications, the method comprising the steps of:

receiving via a first base site, a first data packet from the packet data router during a first packet data communication session;

processing a transport protocol layer of the first data packet;

determining whether the communication unit is to remain involved in the first packet data communication session based at least on information contained in the transport protocol layer of the first data packet;

when the communication unit is to remain involved in the first packet data communication session, transmitting a registration message to the system controller upon entering a new service coverage area;

determining an application type of the first packet data communication session, the application type being indicated within a header of the transport protocol layer of the first data packet;

determining whether at least a second data packet is to be received based on the application type; and when the at least a second data packet is to be received, transmitting a registration message to the system controller upon entering a new service coverage area.

13. The method of claim 12, wherein the application type is a file transfer protocol, a trivial file transfer protocol, or a simple mail transfer protocol.

14. A packet data router for use in a mobile radio communication system that includes the packet data router, a system controller, a communication unit, and a plurality of base sites, the plurality of base sites serving respective service coverage areas, the service coverage areas being grouped into a plurality of location areas, each location area of the plurality of location areas including at least one service coverage area, the packet data router comprising:

a mobility database that identifies a mobility status of the communication unit;

a network protocol layer analyzer, coupled to each base site, that receives a first data packet intended for the communication unit, processes a network protocol layer of the first data packet, and determines a routing address of the communication unit based on information contained in the network protocol layer; and a transport protocol layer analyzer, coupled to the mobility database, the network protocol layer analyzer, and the system controller, that receives the first data packet, processes a transport protocol layer of the first data packet, determines whether the communication unit is presently involved in a packet data communication session based on information contained in the transport protocol layer, instructs the network protocol layer analyzer to route the first data packet to a first base site identified in the mobility database when the communication unit is presently involved in a packet data communication session, the first base site serving a service coverage area containing the communication unit, and instructs the system controller to page the communication unit via each base site serving a service coverage area of a location area containing the communication unit when the communication unit is not presently involved in a packet data communication session.

* * * * *